March 5, 1957

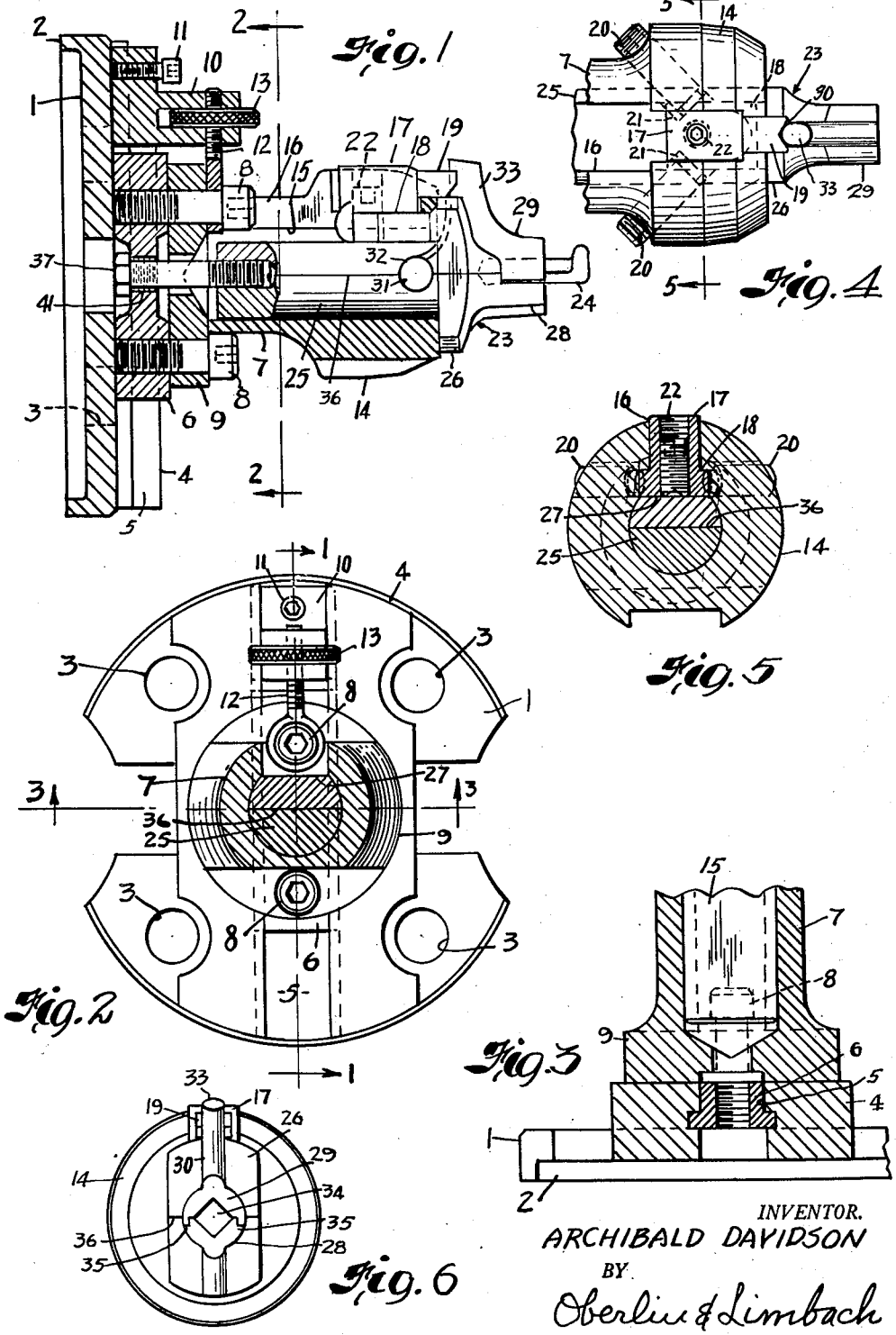

A. DAVIDSON 2,783,527

TOOL HOLDER

Filed March 26, 1953

INVENTOR.
ARCHIBALD DAVIDSON
BY
Oberlin & Limbach
ATTORNEYS

United States Patent Office 2,783,527
Patented Mar. 5, 1957

2,783,527

TOOL HOLDER

Archibald Davidson, Lakewood, Ohio

Application March 26, 1953, Serial No. 344,831

15 Claims. (Cl. 29—103)

This invention relates, as indicated, to tool holders and more particularly to a holder for use with machine tools, such for example as milling machines. The holders and tool posts of this nature presently available are generally limited with respect to the classes of tools, such as shapers, rotary cutters, and the like, which any one holder is adapted to mount, and, as a result, it is often necessary to remove a particular holder completely from the machine and substitute another in order to perform a different type of working operation. It is a primary object of my invention to provide a holder which will readily and efficiently mount most, if not all, types of tools commonly used in machine tools.

A further object of my invention is to provide a holder designed for attachment to a machine tool wherein a clamping member is operative to exert a force acting along a path spaced from and parallel to the holder axis. An additional object is to provide a holder of this nature having means for clamping in a direction normal to the axis of the holder and also in a direction parallel thereto. A further additional object of the invention is the provision of a tool holder including special adapter elements which may be used therewith optionally to mount varying types of tools. It is also an object of my invention to provide a jaw-clamping device for cutters and the like.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a longitudinal section of my tool holder showing a small radius cutter supported thereby, such section being viewed from the line 1—1 in Fig. 2;

Fig. 2 is a transverse section taken on the line 2—2 in Fig. 1;

Fig. 3 is a section as viewed from the plane of line 3—3 in Fig. 2;

Fig. 4 is a fragmentary top plan view of the Fig. 1 assembly without the cutter;

Fig. 5 is a transverse section taken on the line 5—5 in Fig. 4;

Fig. 6 is an end view as appearing from the right of Fig. 4;

Figure 7:
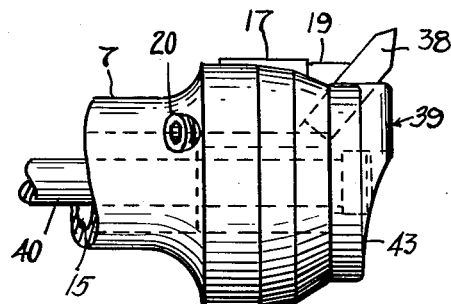
Fig. 7 is a fragmentary elevation of the holder mounting a different type of cutter.
Figure 8:
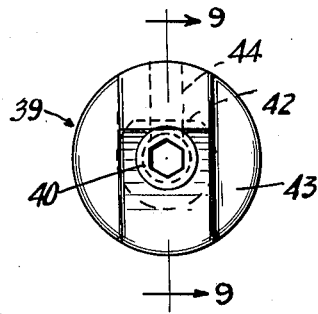
Fig. 8 is an end view of the adapter used in the Fig. 7 assembly.
Figure 9:
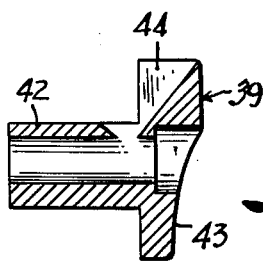
Fig. 9 is a section taken on the line 9—9 in Fig. 8.

Referring now to the drawings in detail and especially to Fig. 1, the holder is provided with a base 1 having a flange 2 on one side for the purpose of engaging about the end of a machine tool working spindle and the like. The base is bored to provide a plurality of openings 3 adapted to pass attaching screws and a boss 4 is formed integral with the opposite side of the base, extending completely thereacross. The boss is provided with a slideway in the form of a T-slot 5, the center of which intersects the axis of the base, and a correspondingly shaped slide 6 is movable within the slideway adjustably to mount the cylindrical body member 7 of the holder.

Body member 7 is attached at one end to this mounting slide by means of screws 8 passing through end flange 9 and engaging in the slide. Flange 9 overlies the surface of the boss 4 so that tightening down of the screws 8 will cause the flange tightly to engage the boss, thus locking the slide and hence the body member relative to the base. By virtue of this slide arrangement, it is possible adjustably to position the body member laterally relative to the axis of the base, and in this manner to secure an eccentric positioning of such body member. In order to provide a fine adjustment, a second slide 10 is also fitted in the slideway 5 and prevented from moving therein by a screw 11 passing vertically through this slide and releasably engaging the bottom of the slideway. Slide 10 is operatively connected to the body member by a threaded stud 12 attached to the latter conveniently by one of the screws 8, and exending parallel to the slideway through slide 10. A thumb nut 13 carried by the slide 10 and engaged on the stud, is operative, when actuated, to advance and retract the mounting slide and body member relative to the stationary slide 10. The boss 4 may be provided with a plurality of scribe marks, not shown, to determine accurately the setting of the body member 7.

The cylindrical member 7, therefore, projects forwardly of the base in selected adjusted position relative to the axis thereof. It is provided with an enlarged head portion 14 at its free end and a center bore 15 within which the shanks of various tools and tool gripping adapters may be fitted. A longitudinal slot 16 is formed in the body wall and extends almost, but not quite, to the forward end of head portion 14, within which it is of slightly lesser width than its width in the central region of the body member as shown. Operatively located in this slot is a clamping slide 17 having a lower flange 18 positioned in the center bore of the body. Slide 17 is reciprocable within the slot and may be outwardly withdrawn therefrom when moved to the center or wider portion thereof. However, when the slide is in the forward extent of slot 16, that is, the extension of the slot in head portion 14, it cannot be so withdrawn or forced outwardly since flange 18 is wider than the slot width at this point.

An upper, forwardly projecting portion 19 of the clamping slide is adapted to project beyond the end face of head 14 when the slide is in forward position in the slot. This condition is shown in Fig. 1, and the underside of the projection is bevelled rearwardly as also shown. Passing angularly through the body member 7 from points just to the rear of the head portion are two screws 20 which extend into the slot in such portion at corresponding points on the opposite sides thereof. These screws extend in a forward direction to engage the flange 18 of the clamping slide at their inner ends, whereby they are operative to urge the slide toward the forward end of the slot. The rear sides of flange 18 are notched as shown at 21 to afford a flat surface contact with the inner ends of screws 20. Clamping slide 17 carries a clamping screw 22 which extends vertically therethrough and, therefore, radially relative to the body member.

In Figs. 1 to 6, the holder is shown in operative association with a jaw clamping device indicated generally at 23 adapted to grip a small radius cutter 24 which conventionally has a square shank. This clamp has a shank 25 adapted to fit within the bore of the holder and a head portion 26 which overlies the end face of head 14 of the holder. The upper surface 27 of shank 25 is flatted for engagement with the bottom surface of the clamping slide 17. A stationary lower jaw 28 is formed integral with head portion 26 and a movable upper jaw 29 is pivotally carried by the clamp for movement toward and away from such lower jaw. To this end, the upper part of head portion 26 is provided with a vertical groove 30 which is directly inwardly at its lower end into communication with a small transverse bore 31 in shank 25 adjacent the portion 26. A pin 32 rigidly attached to jaw 29 is disposed in this bore, while the upstanding portion 33 of the jaw is seated in groove 30. As a result, portion 33 of the upper jaw may be actuated to rock this jaw about the pivotal connection into and out of clamping engagement with the lower jaw. The two jaws provide an opening 34 of square shape cross-section, as best shown in Fig. 6, and the meeting faces of the jaws are correspondingly stepped laterally as shown at 35, thereby to overlap when engaged and afford increased support.

Since upper jaw 29 is interfitted in the clamp, that is, it is locked interiorly by pin 32 in the bore 31, the clamp is preferably made in two longitudinal sections, the seam formed thereby being indicated at 36. If desired, such sections may be permanently united, for example by welding, in assembled form.

Clamp 23 is positioned in the holder with its flatted upper surface 27 in engagement with the bottom of clamping slide 17 and jaw portion 33 disposed to be engaged by projection 19 of the slide. It will be seen that the slide will prevent rotation of the clamp relative to the holder and that screws 20 may be threaded inwardly to force the upper jaw into tight engagement with the lower jaw, thereby firmly to clamp a tool such as the cutter shown. In order to prevent the clamp from pulling out of the holder, a screw 37 is provided which passes through the mounting slide 6 and engages in the inner end of clamp shank 25. The cutter is held substantially on the axis of the cylindrical body of the holder, which may be aligned with the base axis, and, therefore, the axis of the machine spindle or other drive member to which the base is attached, or off-set relative thereto, as desired.

Since the clamping slide projection 19 is movable in a path spaced from and parallel to the axis of the body member 7, it exerts a positive clamping pressure about such axis. The utilization of this feature is not limited to the clamping of small cutters of the nature shown in Fig. 1, but may also be used to clamp cutters of the type shown in Fig. 7. The cutter 38 there shown is supported angularly relative to the axis of the body member, thereby permitting a considerably larger radius to be cut. In this assembly, the clamp 23 has been removed from the body member 7, and a special adapter indicated generally at 39 fitted therein. This adapter is attached by means of the axially extending screw 40 engaging in the mounting slide 6 which is threaded at 41 for this purpose. It may be noted that screw 37 used to attach the clamp 23 clears these threads.

Adapter 39 has a flatted shank 42 which is engaged by the underside of the clamping slide, to prevent turning in the holder bore, and a head portion 43 which overlies the end face of the holder head 14. A slot 44 of square cross-section is formed in the upper rear face of portion 42, inclining forwardly as shown, to seat the cutter 38. The bevelled underside of slide projection 19 engages the thus seated cutter to clamp the same tightly when screws 20 are threaded inwardly. As in the Fig. 1 assembly, therefore, the slide 17 is operative to exert a tool clamping pressure.

Figure 10:
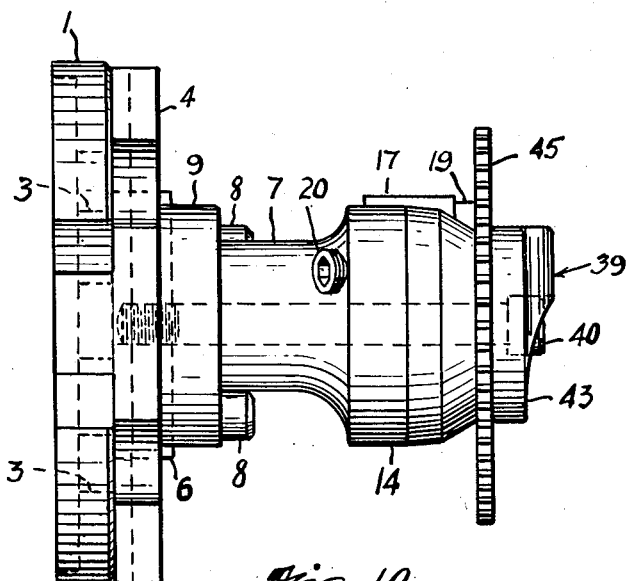
Fig. 10 is a view in elevation of the holder having a circular saw attached thereto.

A further use of this adapter is shown in Fig. 10 wherein it is employed to clamp a circular saw blade 45 to the holder. In this use of the holder, the slide is operative to stabilize the saw blade against flutter. The central opening of the blade will correspond in shape to the cross-section of shank 42 in conventional manner to prevent relative rotation therebetween.

It will be apparent from the foregoing that my holder is adapted removably to connect tools of widely varying type to a power driven element such as the spindle of a milling machine, and in many instances the conversion from one operation to another does not necessitate removal of the base 1 or the body member 7 but only of a relatively simple adapter. It will be also obvious that the tools which I have specifically shown are not exhaustive of the tools which may be used with the holder, for example, a flatted boring bar could be supported equally as well, the clamping screw 22 of the slide 17 engaging such bar in the bore of the body member.

The head 14 of the holder may, if desired, be cut away on each side of the slot therein to provide thumb access, permitting the slide 17 to be manually held as one tool or tool gripping adapter is removed from the holder bore and replaced with another.

Other modes of applying the principle of the invention may be employed, change being made as regards the details described, provided the features stated in any of the following claims, or the equivalent of such, be employed.

I therefore particularly point out and distinctly claim as my invention:

1. A tool-supporting attachment for machine tools and the like, comprising a base adapted to be removably mounted in rotatable driven engagement on such machine tool, said base having a slideway formed therein intersecting centrally the axis of such rotation at right angles thereto, a mounting slide movable in said slideway, a generally cylindrical body member provided with a center bore and attached at one end to said mounting slide to partake of the movement thereof, means operative adjustably to lock said mounting slide in said slideway and hence said body member in selected adjusted position relative to the axis of such rotation, a longitudinal slot formed in the wall of said body member, a clamping slide movable in said slot having a flange of a width greater than the width of said slot received in the bore of said body member, means carried by said clamping slide operative to exert clamping pressure radially inwardly of said body member, said clamping slide having a forwardly extending projection operatively spaced from the axis of said body member and adapted to project beyond said body member when said slide is in forward position in said slot, and clamping screws passing angularly through said body member in a forward direction and into said slot at corresponding points on the sides thereof, said clamping screws being operative to engage the rear of said clamping slide to urge the same forwardly, whereby the forward projection of said clamping slide is operative to exert a force acting parallel to the axis of said body member.

2. A tool-supporting attachment for machine tools and the like, comprising a base adapted to be removably mounted in rotatable driven engagement on such machine tool, a generally cylindrical body member provided with a center bore and having a longitudinal slot formed in the wall thereof, means adjustably attaching one end of said body member to said base for lateral movement thereon, means operative to lock said body member in selected adjusted position relative to said base, a clamping slide movable in said slot having a flange of a width greater than the width of said slot received in the bore of said body member, means carried by said clamping slide operative to exert clamping pressure radially inwardly of said body member, said clamping slide having a forwardly extending projection operatively spaced from the axis of said body member and adapted to project beyond said body member when said slide is in forward position in said slot, and clamping screws passing angularly through said body member in a forward direction and into said slot at corresponding points on the sides thereof, said clamping screws being operative to engage the rear of said clamping slide to urge the same forwardly, whereby the forward projection of said clamping slide is operative to exert a force acting parallel to the axis of said body member.

3. A tool-supporting attachment for machine tools and the like, comprising a base adapted to be removably mounted in rotatable driven engagement on such machine tool, a generally cylindrical body member attached at one end to said base provided with a center bore and having a longitudinal slot formed in the wall thereof, a clamping slide movable in such slot having a flange of a width greater than the width of such slot received in the bore of said body member, means carried by said clamping slide operative to exert clamping pressure radially inwardly of said body member, said clamping slide having a forwardly extending projection operatively spaced from the axis of said body member and adapted to project beyond said body member when said slide is in forward position of such slot, and clamping screws passing angularly through said body member in a forward direction and into such slot at corresponding points on the sides thereof, said clamping screws being operative to engage the rear of said clamping slide to urge the same forwardly, whereby the forward projection of said clamping slide is operative to exert a force acting parallel to the axis of said body member.

4. A tool-supporting attachment for machine tools and the like, comprising a base adapted to be removably mounted in rotatable driven engagement on such machine tool, a generally cylindrical body member attached at one end to said base provided with a center bore and having a longitudinal slot formed in the wall thereof, a clamping slide movable in such slot having a forwardly projecting portion operatively spaced from the axis of said body member and adapted to project beyond said body member when said slide is in forward position in such slot, and calmping screws passing angularly through said body member in a forward direction and into such slot, said clamping screws being operative to engage said clamping slide to urge the same forwardly, whereby the forward projection of said clamping slide is operative to exert a force acting parallel to the axis of said body member.

5. A tool holder comprising a hollow generally cylindrical body member having a longitudinal slot formed in the wall thereof, a clamping slide movable in said slot having a flange of greater width than the width of said slot operatively disposed interiorly of said body member, means carried by said slide operative to exert clamping pressure radially inwardly of said body member, said clamping slide having a forwardly extending projection operatively spaced from the axis of said body member and adapted to project beyond said body member when said slide is in forward position in such slot, and clamping screws passing angularly through said body member in a forward direction and into said slot, said clamping screws being operative to engage said clamping slide to urge the same forwardly, whereby the forward projection of said clamping slide is operative to exert a force acting parallel to the axis of said body member.

6. A tool holder comprising a hollow generally cylindrical body member having a longitudinal slot formed in the wall thereof, a clamping slide movable in said slot having a projection operatively spaced from the axis of said body member and adapted to project beyond said body member when said slide is in forward position in such slot, and clamping screws passing angularly forwardly through said body member and into said slot at the respective sides of the latter, said clamping screws being operative to engage said clamping slide to urge the same forwardly, whereby the projection of said clamping slide is operative to exert a force acting parallel to the axis of said body member.

7. A tool holder comprising a hollow generally cylindrical body member, a clamping slide movable axially relative to said body member, said clamping slide having a projection operatively spaced from the axis of said body member and adapted to project beyond said body member when said slide is in forward position relative thereto, and means operative to engage said clamping slide to urge the same in a forward direction.

8. A holder for cutters and the like, comprising a hollow generally cylindrical body member having a longitudinal slot formed in the wall thereof, detachable clamp means overlying an end of said body member and having a flatted shank fitted therein, said clamp means being operative to support such cutter against said body member in angularly outwardly projecting relation thereto, and a clamping slide in such slot having a generally flat bottom surface and a forwardly extending projection spaced from the axis of said body member, the bottom of said slide engaging the flatted shank of said clamp means and such projection engaging the thus supported cutter when the slide is moved to a forward clamping position in the slot.

9. A holder for cutters and the like, comprising a hollow generally cylindrical body member having a longitudinal slot formed in the wall thereof, clamp means having a flatted shank fitted within said body member and including a pair of cooperable jaws adapted to clamp such cutter in substantially axial alignment with said body member, one of said jaws being movable relative to the other and having a portion extending radially of said body member, a clamping slide movable in such slot operative to engage such radially extending portion of such movable jaw at a point spaced from the axis of said body member, said slide having a flange of greater width than the width of such slot engaging the flatted surface of such shank within said body member, and means operative to urge said slide in a direction to move such movable jaw into clamping engagement with such other jaw.

10. A holder for cutters and the like, comprising a hollow generally cylindrical body member having a longitudinal slot formed in the wall thereof, a pair of cooperable jaws attached to said body member adapted to clamp such cutter in substantially axial alignment therewith, one of said jaws being movable relative to the other and having a portion extending radially of said body member, a clamping slide movable in such slot operative to engage such radially extending portion of said one jaw at a point spaced from the axis of said body member, and means operative to urge said slide in a direction to move such movable jaw into clamping engagement with such other jaw.

11. A tool-clamping assembly comprising, a shank having an enlarged head at one end thereof and a transverse bore adjacent such head, a stationary jaw integral with the lower portion of such head and projecting therefrom at right angles relative to such bore, the upper portion of such head being provided with a vertically extending groove which is directed inwardly at its lower end to communicate with such bore, and a movable jaw member cooperable with said stationary jaw to clamp a tool shank therebetween, said movable jaw member having an upstanding part seated in such groove and a rigidly attached pivot pin received in such bore, the upstanding part of said movable jaw member projecting beyond such head, whereby it may be engaged to move such jaw member, the meeting faces of such jaws being correspondingly stepped laterally, thereby to overlap when engaged.

12. A tool clamp comprising a shank having an enlarged head at one end thereof, a stationary jaw projecting forwardly from such head, and a movable jaw having an integral pivot portion received within such shank so that this jaw may move toward and away from said stationary jaw, said movable jaw having a portion extending beyond such head, whereby a forwardly acting force applied to such portion is operative to move said movable jaw into clamping engagement with said stationary jaw.

13. A tool holder comprising a hollow generally cylindrical body member having a longitudinal slot formed in the wall thereof, a clamping slide movable in said slot and having a flange of greater width than the slot width disposed interiorly of said body member, said clamping slide having a forwardly extending projection spaced from the axis of said body member and adapted to project therebeyond when the slide is in forward position in such slot, and screw means for advancing said clamping slide in such slot, whereby the forward projection of the slide is operative to exert a force spaced from and acting generally parallel to the axis of said body member.

14. A tool-supporting attachment for machine tools and the like, comprising a base adapted to be removably mounted in rotatable driven engagement on such machine tool, a generally cylindrical body member attached at one end to said base and having a center bore with a longitudinal slot formed in the wall, a clamping slide movable in such slot provided with a forwardly projecting portion which is spaced from the axis of said body member and adapted to project therebeyond when the slide is in forward position in the slot, clamping screws passing angularly through said body member in a forward direction and into the slot, and a cutting tool supported at the outer end of said body member, said screws being operative to urge said slide forwardly to exert clamping pressure on said tool by means of the slide projection.

15. A tool holder comprising a hollow generally cylindrical body member having a longitudinal slot in the wall thereof, a clamping slide movable in such slot and having a flange of greater width than the slot width operatively disposed interiorly of the body member, means carried by said slide operative to exert clamping pressure radially inwardly of the body member, an adapter having a flatted shank on which a disc-type cutting tool is mounted, the shank of said adapter being fitted in said body member and clamped by the radial pressure means of the slide with the slide bottom engaging the flat shank surface, said clamping slide having a forwardly extending projection spaced from the axis of the body member and adapted to project therebeyond to engage such cutting tool when the slide is in a forward position in the slot, and clamping screws passing angularly through said body member in a forward direction and into said slot to engage the clamping slide and urge the same forwardly.

References Cited in the file of this patent
UNITED STATES PATENTS

| | | |
|---|---|---|
| 1,321,970 | Beach | Nov. 18, 1919 |
| 1,970,016 | Morton | Aug. 14, 1934 |
| 2,361,324 | Severson | Oct. 24, 1944 |
| 2,386,652 | Borg | Oct. 9, 1945 |
| 2,447,334 | Healy | Aug. 17, 1948 |